United States Patent [19]
Poirier et al.

[11] Patent Number: 4,951,773
[45] Date of Patent: Aug. 28, 1990

[54] VEHICLE TRACTION CONTROL SYSTEM WITH FUEL CONTROL

[75] Inventors: David C. Poirier, Troy; Mark T. Matheny, Canton; Harold M. Martin, Southfield; Gerald J. Wroblewski, Plymouth; Robert C. Simon, Jr., Novi, all of Mich.

[73] Assignee: General Motors Corporation, Detroit, Mich.

[21] Appl. No.: 385,321

[22] Filed: Jul. 25, 1989

[51] Int. Cl.⁵ .............................................. B60K 31/00
[52] U.S. Cl. .................................. 180/197; 123/333; 123/481
[58] Field of Search ................. 180/197; 123/198 DB, 123/332I-335, 478, 481

[56] References Cited

U.S. PATENT DOCUMENTS

| | | | |
|---|---|---|---|
| 3,756,205 | 9/1973 | Frost | 123/481 |
| 4,432,430 | 2/1984 | Lino et al. | 180/197 |
| 4,616,621 | 10/1986 | Kuroiwa et al. | 123/339 X |
| 4,721,176 | 1/1988 | Kabasin et al. | 180/197 |
| 4,811,808 | 3/1989 | Matsumoto et al. | 123/198 DB X |
| 4,860,849 | 8/1989 | Anderson et al. | 123/333 X |

Primary Examiner—Charles A. Marmor
Assistant Examiner—Wook Yoon
Attorney, Agent, or Firm—Howard N. Conkey

[57] ABSTRACT

The ratio air and fuel mixture delivered to the fueled cylinders of an engine of a vehicle is controlled while selective cylinders of the engine are unfueled to reduce engine torque output to inhibit excessive wheel spin during vehicle acceleration. The air/fuel ratio of the mixture delivered to the fueled cylinders is increased as cylinders are selectively unfueled to reduce engine torque output and power enrichment to the fueled cylinders is inhibited when any cylinders are unfueled to reduce engine torque output for traction control and for a time period after all cylinders are again fueled.

4 Claims, 5 Drawing Sheets

VEHICLE TRACTION CONTROL SYSTEM WITH FUEL CONTROL

BACKGROUND OF THE INVENTION

This invention relates to a vehicle traction control system and, more particularly, to such a system that includes limiting wheel spin by withholding fuel from selected cylinders of the engine by disabling selected fuel injectors in a port injected internal combustion engine.

Various methods have been proposed for preventing an excessive spinning condition of the driven wheels of a vehicle during vehicle acceleration when the operator initiated engine torque delivered to the vehicle driven wheels are such that the frictional forces between the tire and the road surface are overcome. These methods include the adjustment of engine torque and/or the application of the brakes of the driven wheels when an excessive acceleration spinning condition is detected. One method of adjusting engine torque output for limiting wheel spin during vehicle acceleration controls the individual injectors in a port injected internal combustion engine so as to selectively withhold fuel from selected cylinders. This disabling of cylinders reduces engine torque output to limit acceleration spin. In this form of system, the cylinders to which fuel is withheld intakes only air during their intake strokes. This air is then discharged into the exhaust system during the exhaust stroke of the cylinders where the air is mixed with the combustion gases discharged into the exhaust system from the operating cylinders.

In order to minimize the amounts of certain exhaust gas components, it is common in automotive vehicles to utilize a catalytic converter through which exhaust gases are discharged to the atmosphere and which is effective to oxidize carbon monoxides and hydrocarbons and to reduce nitrogen oxides. When the engine torque output is reduced by withholding fuel from one or more cylinders to limit excessive wheel spin in a vehicle in which the exhaust gases are discharged to the atmosphere through a catalytic converter, the air discharged into the exhaust system from the disabled cylinders combined with the combustion by-products of the operating cylinders creates a condition in which, the catalytic converter may be heated to excessive levels giving rise to a potential for damage to the catalytic converter. This is particularly the case when the engine is being operated in a power enrichment mode wherein the air/fuel ratio is rich resulting in a discharge of unburned hydrocarbons and carbon monoxide into the exhaust system which is then mixed with the oxygen-rich air discharged into the exhaust system from the disabled cylinders. The resulting oxidation of the hydrocarbons and carbon monoxides increase the temperature of the catalytic converter with the potential of excessive temperature conditions.

It would therefore be desirable to provide a method of protecting the catalytic converter in a traction control system wherein the engine torque output is restricted to prevent excessive wheel spin by selectively unfueling cylinders of the engine.

SUMMARY OF THE INVENTION

The present invention is directed to a method of controlling the air and fuel mixture delivered to the fueled cylinders of an engine of a vehicle having a catalytic converter in the exhaust discharge path of the engine so as to protect the catalytic converter from excessive temperatures while selective cylinders of the engine are unfueled to reduce engine torque output to inhibit excessive wheel spin during vehicle acceleration.

In general, the invention provides for assuring that unburned hydrocarbons are not present in the oxygen-rich atmosphere in the exhaust gases resulting from unfueling selected cylinders of the engine for traction control. In one aspect of the invention, power enrichment to the fueled cylinders is inhibited when any cylinders are unfueled to reduce engine torque output for traction control.

In another aspect of the invention, the air/fuel ratio of the mixture delivered to the fueled cylinders is increased as cylinders are selectively unfueled to reduce engine torque output.

In another aspect of the invention, the amount that the air/fuel ratio is leaned out is a function of the number of cylinders disabled by unfueling for traction control.

In yet another aspect of the invention, the amount that the air and fuel mixture supplied to the enabled cylinders is leaned out is a function of the engine coolant temperature.

In summary, the invention provides for reducing the amounts of hydrocarbons and carbon monoxide discharged into the exhaust system from the fueled cylinders and therefore available for combination with the excessive oxygen delivered to the exhaust system from the unfueled cylinders.

DESCRIPTION OF THE DRAWINGS

The invention may be best understood by reference to the following description of a preferred embodiment and the drawings in which.

Figure 1:
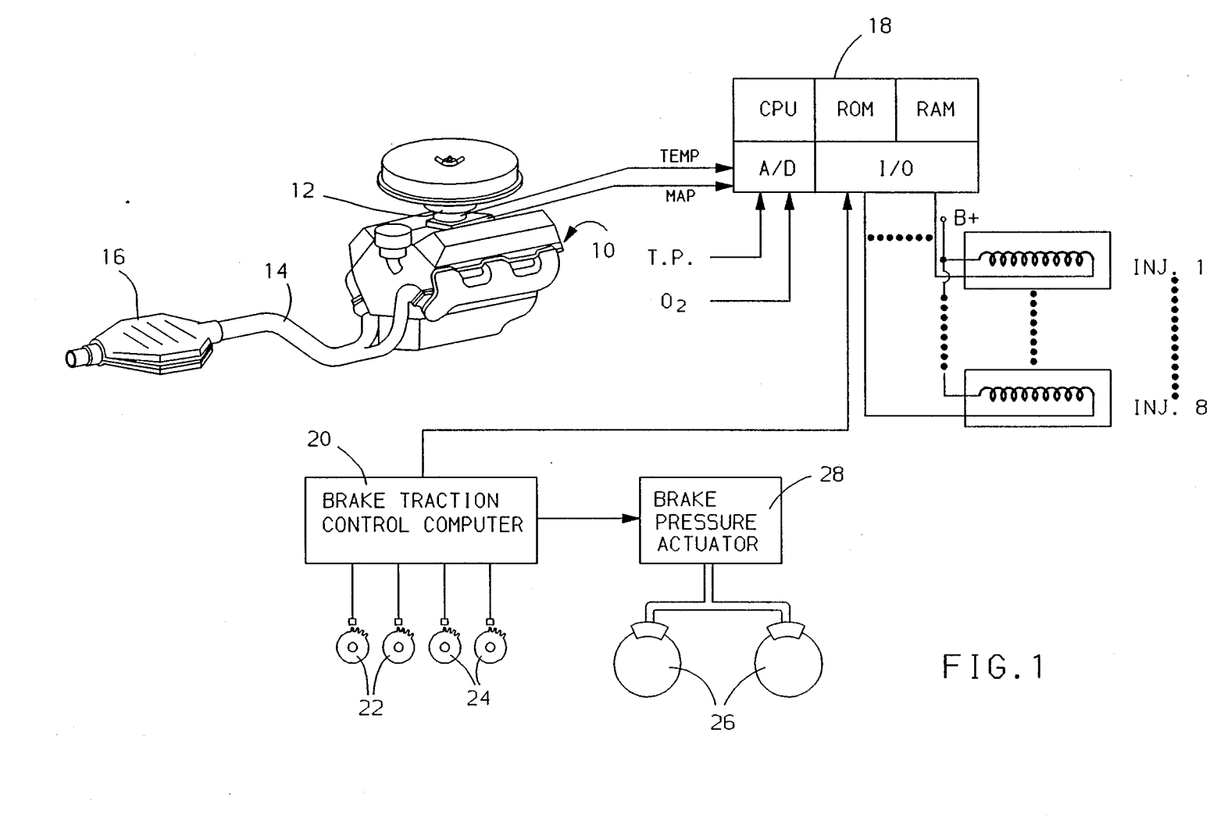
FIG. 1 illustrates the general form of a traction control system for a vehicle port fuel injected internal combustion engine.

Referring to FIG. 1, the present invention is described as applied to a vehicle 8-cylinder internal combustion engine 10 in which each cylinder is provided fuel via a respective one of 8 fuel injectors INJ1–INJ8. This form of fuel delivery system is commonly referred to as a port fuel injection system. Air is drawn into the intake manifold of the engine 10 via an intake throttle bore having an operator controlled throttle therein for regulating air flow into the engine 10. Air and the fuel provided by an injector for a cylinder is drawn into the cylinder and undergoes combustion to develop driving torque delivered to the driven wheels of the vehicle. The combustion gases from the cylinder are then discharged into an exhaust conduit 14 which includes a conventional three-way catalytic converter 16 and then to the atmosphere. As is well known, the catalytic converter 16 functions to simultaneously convert carbon monoxide, hydrocarbons and nitrogen oxides and thereby reduce emission of those components into the atmosphere.

The engine 10 is controlled by a conventional digital controller 18. Included in this control is the conventional control of the individual fuel injectors INJ1-INJ8 for injecting fuel to each of the respective cylinders of the engine 10 in timed relation to engine rotation. In general, the injectors are controlled in response to various engine and vehicle operating parameters to achieve a scheduled air/fuel ratio. These parameters may include engine coolant temperature TEMP, manifold absolute pressure MAP, throttle position TP, engine speed RPM, vehicle speed and the output $O_2$ of an exhaust oxygen sensor each being provided by a conventional transducer. While not illustrated, the controller 18 also controls in conventional manner other engine and vehicle systems including ignition spark timing, vehicle transmission, etc.

The digital controller 18 takes the form of a conventional general purpose digital computer programmed to perform the various control functions including the control of the fuel injectors INJ1-INJ8 for establishing a desired air/fuel ratio and for limiting the engine torque output for traction control in accord with the principles of this invention and as will hereinafter be described. The digital controller 18 is comprised of a read-only memory ROM, a random access memory RAM, an analog-to-digital converter A/D, and an input/output section I/O which receives discrete signal inputs and provides discrete signal control outputs such as to the fuel injectors INJ1-INJ8. In general, under control of the program stored in the ROM, the digital controller 18 executes various routines at timed intervals for accomplishing the various control functions.

To provide for the limiting of acceleration spin of the driven wheels of the vehicle for traction control, the preferred embodiment of the invention controls both the brakes of the driven wheels and the engine torque output. The control of the driven wheel brakes is provided by a conventional brake traction control system that includes a brake traction control computer 20 that responds to the speeds of the vehicle driven wheels via speed sensors 22 and the speeds of the undriven wheels provided by wheel speed sensors 24. The brake traction control computer actuates the driven wheel brakes 26 via a brake pressure actuator 28 to limit wheel spin when the speeds of the respective wheel speed sensors 22 and 24 represent an excessive acceleration spin condition in response to the application of excessive torque to the driven wheels via the internal combustion engine 10.

The brake traction control computer 20 may take any conventional form including a general purpose digital computer such as the digital controller 18. The brake pressure actuator 28 may also take any conventional form and may include, for example, a DC torque motor responding to a signal output of the traction control computer 20 for controlling a piston establishing a controlled hydraulic pressure in the wheel brakes 26.

While operation of the driven wheel brakes 26 may operate to limit wheel spin, it is undesirable to continuously apply large amounts of braking pressure to the driven wheels. For example, long periods of brake application for limiting wheel spin during conditions of high engine torque output may result in the brakes heating to unacceptable levels. In order to prevent this condition, the engine torque output is limited when traction control is required to limit wheel spin by selectively disabling the injection of fuel to one or more cylinders of the internal combustion engine 10. By withholding fuel from a cylinder, the cylinder intakes only air and does not operate to generate torque for driving the driven wheels. The air drawn into the cylinder is discharged into the exhaust conduit 14 on the exhaust stroke.

In general, the brake traction control computer 20 provides a traction control active signal to the digital controller 18 indicating that wheel slip is being limited by actuation of the brakes 26 in response to a sensed excessive spin condition. The controller 18 then one-by-one disables the injection of fuel to selected cylinders in ramp fashion until a selected maximum number of cylinders such as four are disabled or until the brake control computer terminates the traction control active signal in response to a sensed recovery from the excessive spin condition. Upon termination of the traction control active signal from the brake traction control computer 20 indicating a recovery from the excessive spin condition, the disabled cylinders are sequentially enabled one-by-one.

As previously described, when fuel is withheld from one or more of the cylinders of the engine 10, those cylinders discharge air into the exhaust conduit 14. This creates a condition of the exhaust gases which may result in a rapid increase in the temperature of the catalytic converter 16. This results from the oxygen in the air discharged into the exhaust conduit 14 and any unburned hydrocarbons or carbon monoxide gases discharged from the fueled cylinders. This condition is amplified if the engine 10 is in power enrichment when the cylinders are disabled resulting in increased amounts of hydrocarbons being discharged into the exhaust conduit 14 along with the oxygen from the disabled cylinders. In accord with this invention, the digital controller 18 provides protection for the catalytic converter 16 when cylinders are selectively disabled by leaning the mixture supplied to the operating cylinders. By leaning the mixture, the combustion conditions in the operating cylinders results in less discharge of hydrocarbons and carbon monoxide gases into the exhaust conduit 14 to thereby prevent a condition resulting in a rapid temperature increase in the catalytic converter 16.

Figure 2A:
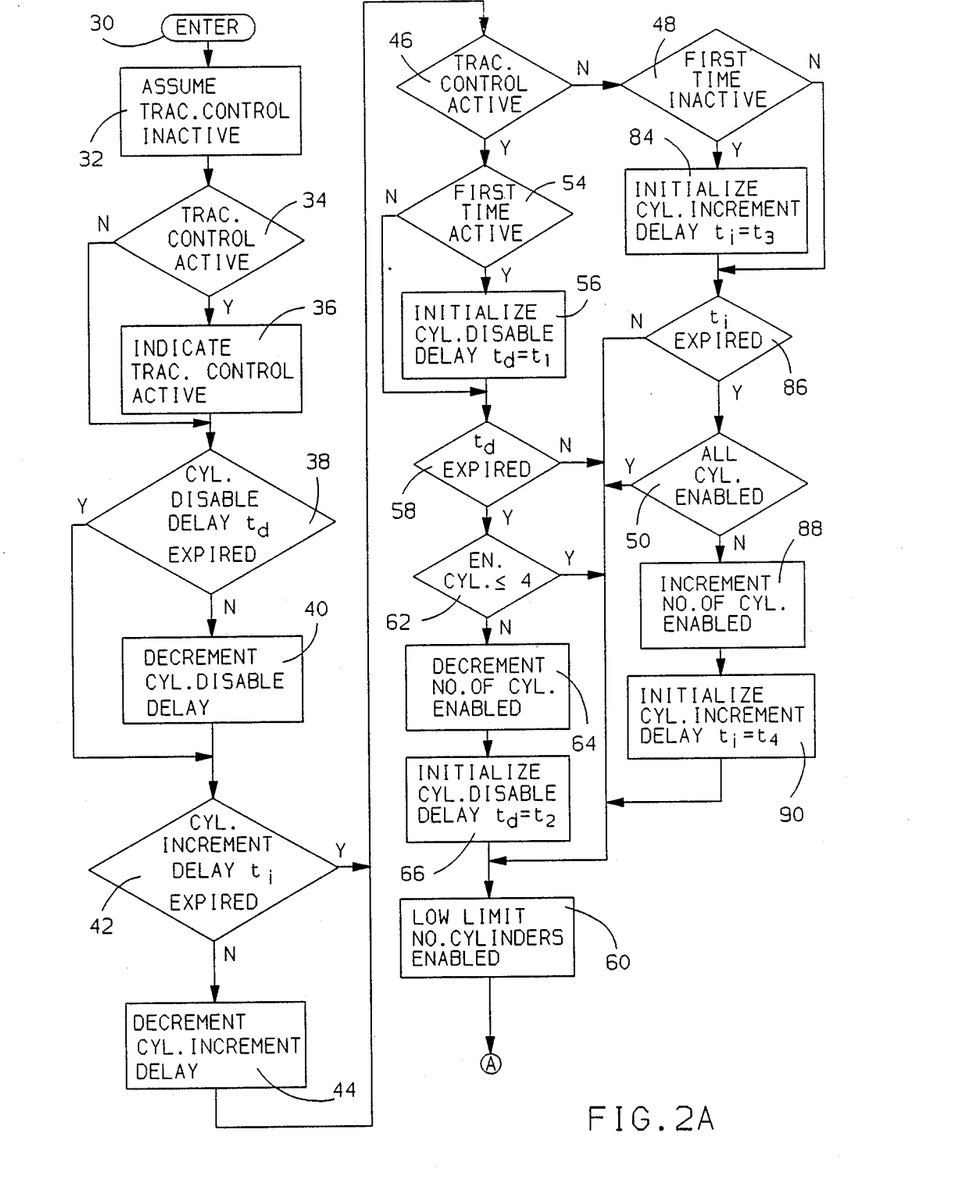
FIGS. 2 and 3 are flow diagrams illustrating the operation of the computer in FIG. 1 in controlling the engine for traction control in accord with the principles of this invention.
Figure 2B:
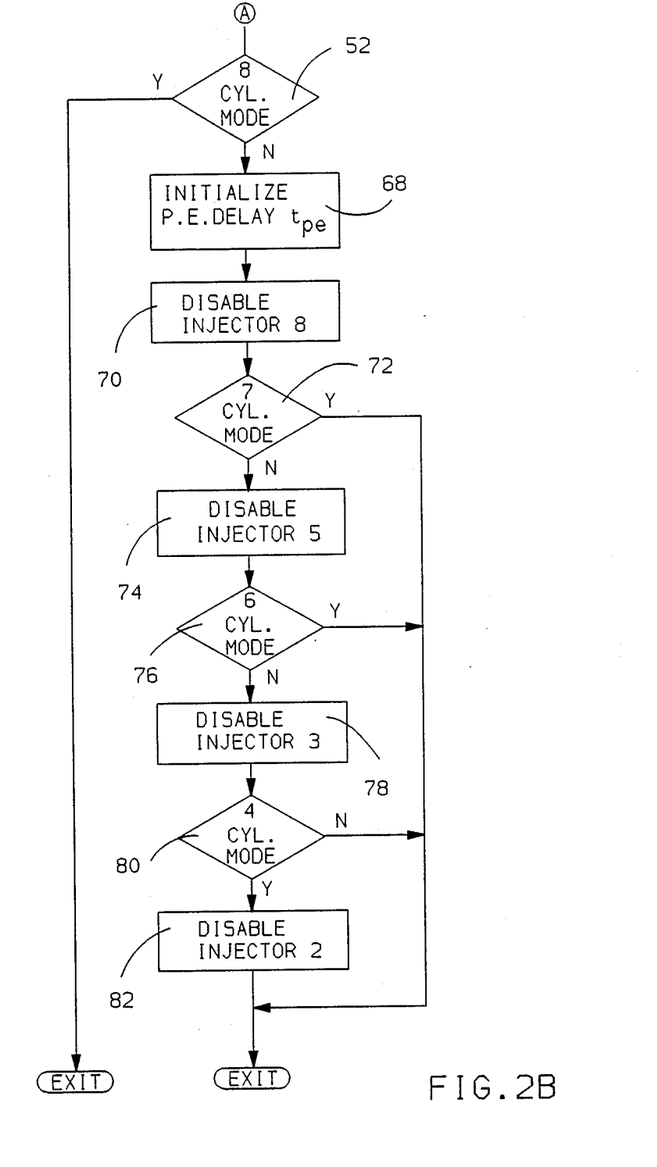

Referring to FIG. 2, there is illustrated the routine for selectively enabling and disabling cylinders of the engine 10 for traction control. This routine is executed repeatedly at a selected interval such as 100 milliseconds. The ROM in the digital controller 18 contains the instructions necessary to implement the algorithm diagrammed in the FIG. 2. It should be noted that in describing the functions of the algorithm encoded in the ROM, references to tasks which have been detailed as flow diagram function blocks will be designated by <nn>, where nn is the particular flow diagram function block text being referenced. The diagrams do not represent the actual ROM instructions It is recognized that there are a variety of known information-processing languages available to one skilled in the art to construct the actual instructions necessary to accomplish the task described by the text in the flow diagram function blocks.

Figure 4:
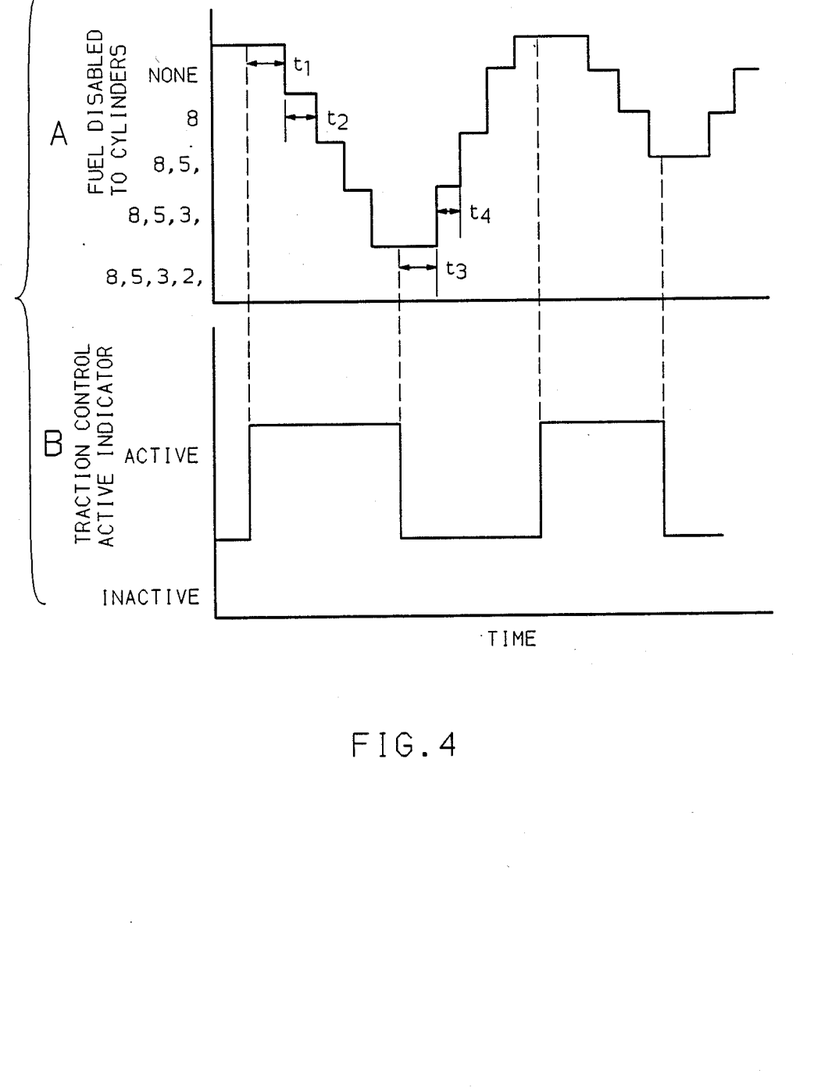
FIG. 4 is a diagram illustrating the selective disabling of the cylinders of the internal combustion engine of FIG. 1 for traction control.

The diagram of FIG. 4 illustrates the operation of the routine of FIG. 2 in controlling the torque output of the engine 10 for traction control. Whenever the traction active signal from the brake traction control computer transitions from not active to active, the number of enabled cylinders is decremented by one after an initial delay of $t_1$ such as 3 seconds. If the traction active indicator is then continuously active thereafter, additional cylinders are disabled at a rate of one every $t_2$ seconds, which may also be 3 seconds, until a minimum of four cylinders is reached. Whenever the traction active signal transitions from active to not active, the number of enabled cylinders shall be incremented by one after an initial delay $t_3$ such as 1 second. If the traction active indicator is then continuously inactive thereafter, additional cylinders are enabled every $t_4$ seconds, which may also be 1 second, until all eight cylinders are enabled.

When the traction control routine is first entered <30>, it is first assumed that traction control is disabled and a traction control active flag is reset <32>. The system then determines whether or not traction control is active by sampling the traction control active or inactive signal from the brake traction control computer 20 <34>. If the traction control signal from the brake traction control computer 20 indicates that traction control is active, the system indicates that traction control is active by setting a traction control active flag <36>.

The program then decrements a cylinder disabled delay $t_d$ if the delay has not yet expired <38,40>. This delay period is the time $t_1$ or $t_2$ of FIG. 4 and as previously described is the time delay imposed before disabling the first or subsequent cylinders.

The computer next decrements a cylinder increment delay $t_i$ if the delay has not yet expired <42,44>. This delay period is the time $t_3$ or $t_4$ of FIG. 4 and as previously described is the time delay imposed before enabling the first or subsequent cylinders.

Assuming initially that the traction control is not active <46> and was not active when the traction control routine of FIG. 2 was last executed <48>, that all cylinders are being fueled and therefore enabled <50> and the engine is in an 8-cylinder mode <52> which is the case when all cylinders are enabled, the program exits the routine. This is the normal operation of the routine during normal unrestricted engine operation.

All of the foregoing steps will be repeated until such time that the traction control active signal is provided by the brake traction control computer 20 indicating an excessive acceleration spin condition exists. When this exists, the traction control active flag is set <36>. This condition is then sensed <46> and the program proceeds to disable the engine 10 cylinders one-by-one subject to the time criteria previously described until a maximum of four cylinders are disabled or until the traction control active signal terminates. If traction control was not active during the prior execution of the routine and is now active <54> the cylinder disable delay $t_d$ is set to the initial delay value $t_1$ illustrated in FIG. 4 <56>. Since just set, the program senses that the time period $t_d$ has not been fully decremented at step 40 <58> and proceeds to establish a minimum number of cylinders that must be enabled <60>. This low limit on the number of cylinders enabled for engine operation may be established, for example, by parameters such as engine coolant temperature, engine speed, rate of change of throttle position or the shift condition of the transmission. Until expiration of the initial delay $t_1$, the foregoing steps are repeated and the engine remains in the 8-cylinder mode and the program exits the routine <52>.

When the initial delay period $t_1$ has been fully decremented <38>, the program checks to determine if the number of fueled cylinders has been decreased to the minimum (four in this embodiment) <62>. If not, the number of fueled cylinders is decreased by one <64> and the cylinder decrement delay $t_d$ is set to the time $t_2$ illustrated in FIG. 4 <66>. As previously described, this is the delay imposed between reductions in the number of enabled cylinders after the initial delay $t_1$. As is done each time the routine is executed, the number of cylinders enabled is limited to a minimum based on the most recent engine and vehicle operating conditions <60>. When less than an 8 cylinder mode, a power enrichment delay $t_{pe}$ is initialized to a value representing a time period before power enrichment can be, enabled after all cylinders are again enabled <68>. As previously described, this is to provide protection for the converter 16. The fuel to the injector for cylinder number 8 is then disabled <70> by imposing a zero pulse at the I/0 output port to the injector for that cylinder. Since the number of cylinders has been decremented only once, the system is in a 7-cylinder mode <72> and the program exits the routine.

As long as the traction control remains active <46>, additional cylinders will be disabled one at a time at intervals of $t_2$ seconds to a low limit of 4 cylinders <58,62,64,66>. When the number of cylinders enabled is 6 or less <72>, the injector for cylinder number 5 is additionally disabled <74>. If the number of cylinders enabled is 5 or less <76>, the injector for cylinder number 3 is additionally disabled <78>. If the number of cylinders enabled is 4 <80>, the injector for cylinder number 2 is additionally disabled <82>. When the number of cylinders corresponding to the mode established through steps 46, 54–58 and 62–66 have been disabled by unfueling, the program exits the routine.

When the traction control active signal is terminated by the brake traction control computer indicating recovery from the excessive spin condition, the number of fueled cylinders is incremented after the initial delay $t_3$ and thereafter at intervals of $t_4$ until all eight cylinders are again fueled.

When the traction control signal is terminated, the routine determines that traction control is inactive <32,34,36>. This condition is then sensed <46> and the program proceeds to enable the engine 10 cylinders one-by-one subject to the time criteria previously described until all eight cylinders are enabled or until the traction control active signal is again generated. If traction control was active during the prior execution of the routine and is now inactive <48>, the cylinder increment delay $t_i$ is set to the initial delay value $t_3$ illustrated in FIG. 4 <84>. This time is decremented with each execution of the traction control routine <42,44> and while unexpired <86> the low limit of the number of cylinders is established <60> and the injectors disabled in accord with the number of cylinders enabled <52,68–82>.

When the initial delay period $t_3$ has been fully decremented to zero <44>, the program checks to determine if the number of fueled cylinders has been incremented to eight <50>. If not, the number of fueled cylinders enabled is increased by one <88> and the cylinder increment delay $t_i$ is set to the time $t_4$ illustrated in FIG. 4 <90>. Thereafter, the cylinders according to the operating mode established through steps 46–50 and 84–90 are disabled as previously described <52,68–82>. The foregoing steps are repeated until all cylinders have been enabled <50> thereby establishing an 8-cylinder mode so that the routine is exited <52>.

In summary, when the traction control active signal from the brake traction control computer 20 shifts from not active to active, the number of enabled cylinders of the engine 10 are decremented by 1 after an initial delay $t_1$. If the traction control active signal is then continuously active thereafter, additional cylinders are disabled at a rate of 1 every $t_2$ seconds until a minimum of 4 cylinders is attained.

Whenever the traction control active signal shifts from active to not active, the number of enabled cylinders are incremented by 1 after an initial delay of $t_3$ seconds. If the traction control active indicator is then continuously active thereafter, additional cylinders are enabled every $t_4$ seconds until all 8 cylinders are again enabled.

The pulse width of the signal for energizing the fuel injectors INJ1–INJ8 is determined by a conventional fuel control routine to establish a desired air/fuel ratio in response to a computed amount of air drawn into each cylinder. The control of the injectors INJ1–INJ8 in timed relation to the engine 10 may take any conventional form. However, in accord with the principles of this invention, the scheduled or computed run air/fuel ratio utilized to compute the pulse width for energizing the injectors INJ1–INJ8 is adjusted when cylinders are unfueled to reduce engine torque output so as to prevent an excessive temperature rise in the catalytic converter 16 as previously described.

Figure 3:
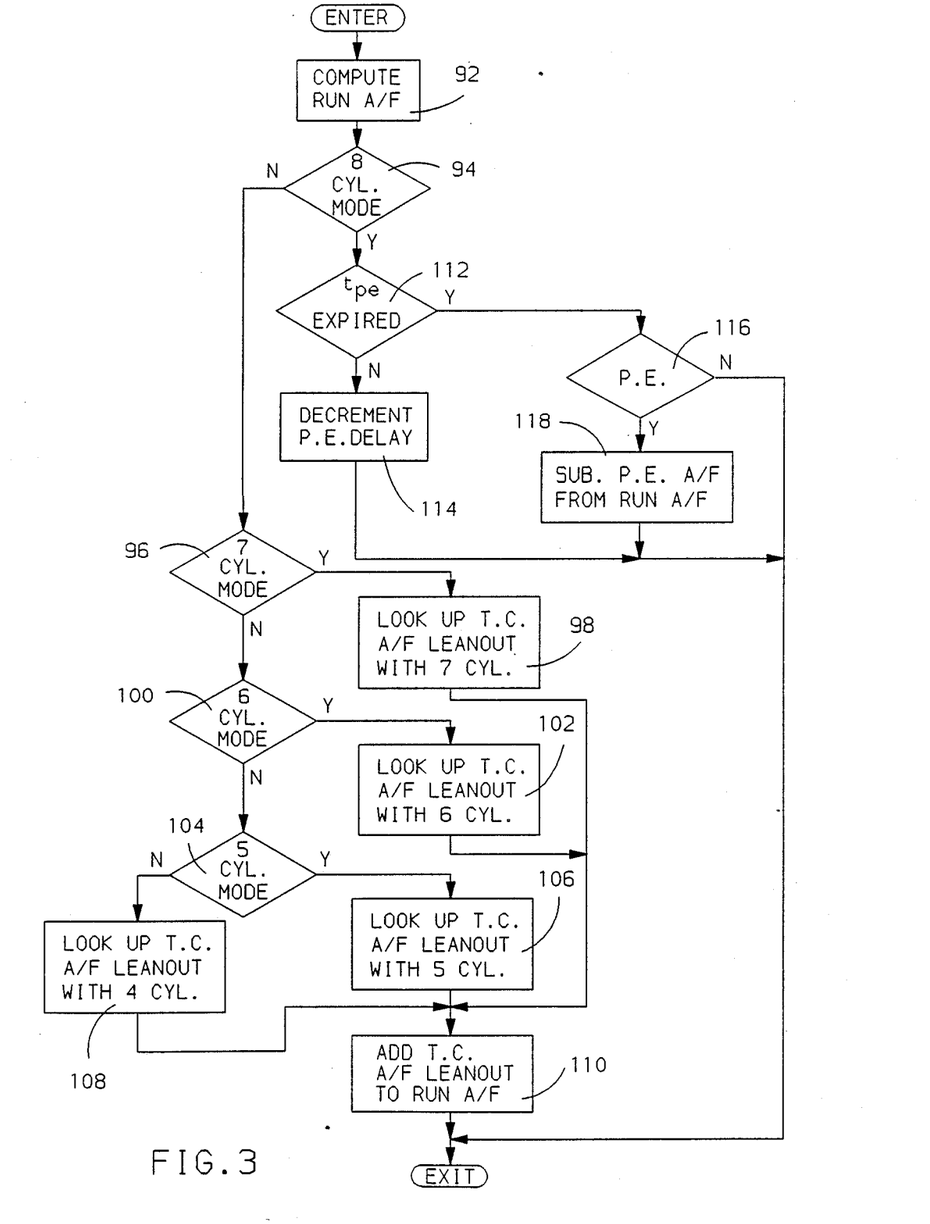

The routine for computing the air/fuel ratio utilized in the fuel control routine for establishing the pulse width for the fuel injectors of the fueled cylinders is illustrated in FIG. 3. Referring thereto, the normal run air/fuel ratio is first computed <92> and then the amount that the normal run air/fuel ratio should be leaned out (increased) is determined. In this embodiment, the amount that the normal run air/fuel ratio is increased is a function of the number of cylinders unfueled for traction control. In addition, the amount that the air/fuel ratio is to be leaned out is a function of coolant temperature. The amount of lean out is predetermined and is established to ensure that an excessive temperature rise of the catalytic converter 16 does not occur to thereby assure reliable operation thereof.

In general, if the system is not operating in an 8-cylinder mode indicating fuel is being withheld from at least one or more of the cylinders of the engine 10 <94>, the particular operating mode is determined. If operating in a 7-cylinder mode <96>, a traction control lean out air/fuel ratio value with 7 fueled cylinders is obtained from a look-up table as a function of coolant temperature <98>. If the system is operating in a 6 cylinder mode <100> a traction control lean-out air/fuel ratio value with 6 fueled cylinders is obtained from a look-up table as a function of coolant temperature <102>. If the system is operating in a 5-cylinder mode <104>, a traction control lean out air/fuel ratio value with 5 fueled cylinders is obtained from a look-up table as a function of temperature <106>. Finally, if the program determines the system is operating in a 4-cylinder mode <104>, a traction control lean-out air/fuel ratio value for 4 fueled cylinders is obtained from a look-up table as a function of temperature <108>. The traction control lean-out air/fuel ratio obtained from the look-up table depending upon the cylinder operating mode is then added to the run air/fuel ratio determined at step 92 <110> to lean out the run air/fuel ratio. The digital controller 18 in executing the fuel control routine then utilizes the leaned out run air/fuel ratio in determining the pulse width applied to the operating injectors of the engine 10 to establish the air/fuel ratio of the mixture in the operating cylinders at the determined leaned out air/fuel ratio.

When the number of cylinders enabled is returned to 8 following termination of the traction control active signal provided by the brake traction control computer 20, power enrichment is enabled only upon expiration of the power enrichment delay $t_{pe}$ initialized at step 68 of FIG. 2. This period is timed when an 8-cylinder mode is detected <94> by decrementing the time until the time $t_{pe}$ has expired <112,114>. If the delay has not yet expired, the program exits the routine and power enrichment is not enabled. However, upon expiration of the power enrichment delay period <112> and if the conditions exist for power enrichment <116>, a power enrichment air/fuel ratio dependent upon engine operating conditions is subtracted from the run air/fuel ratio to enrich the mixture for power enrichment <118>. Thereafter the program exits the air/fuel ratio control routine. If the conditions for power enrichment do not exist <116>, the step 118 is bypassed and the program exits the routine.

The air/fuel ratio established by the routine of FIG. 3 is then utilized by the digital controller 18 in the normal fuel control routine to establish the air/fuel ratio of the mixture supplied to the fueled cylinders of the engine 10 to the desired ratio. As previously described, this ratio is controlled to a value to ensure protection of the catalytic converter 16 by leaning out the mixture dependent upon the number of disabled cylinders and by inhibiting operation of power enrichment while cylinders are disabled and for a period after all cylinders are first enabled following control of engine torque by unfueling selected cylinders.

The foregoing description of a preferred embodiment of the invention for purposes of illustrating the invention is not to be considered as limiting or restricting the invention since may modifications may be made by the exercise of skill in the art without departing from the scope of the invention.

We claim:

1. A method of traction control for a vehicle having wheels driven by an engine having a number of cylinders into which air is drawn and a respective fuel injector for each cylinder for delivering fuel to the cylinder that is mixed with air drawn into the cylinder to establish a scheduled air/fuel ratio of the mixture in the cylinder, the method comprising the steps of:

sensing an excessive acceleration spin condition of the driven wheels;

disabling injection of fuel from selected fuel injectors to withhold fuel from their respective cylinders to reduce engine torque output driving the wheels when an excessive acceleration spin condition is sensed so as to allow recovery from the excessive acceleration spin condition, the remaining fuel injectors being enabled to deliver fuel to their respective cylinders to establish the scheduled air/fuel ratio therein;

setting a value of the scheduled air/fuel ratio by (A) determining a normal run air/fuel ratio and (B) increasing the determined normal run air/fuel ratio when injection of fuel from selected fuel injectors is disabled so that the air/fuel ratio of the mixture in the cylinders corresponding to the enabled fuel injectors is leaned out from the normal run air/fuel ratio when fuel is being withheld from the remaining cylinders.

2. The method of claim 1 wherein the increase in the determined normal run air/fuel ratio is a predetermined function of the number of selected fuel injectors from which injection of fuel is disabled.

3. The method of claim 2 wherein the increase in the determined normal run air/fuel ratio is further a predetermined function of engine temperature.

4. A method of traction control for a vehicle having wheels driven by an engine having a number of cylinders into which air is drawn and a respective fuel injector for each cylinder for delivering fuel to the cylinder that is mixed with air drawn into the cylinder to establish a scheduled air/fuel ratio of the mixture in the cylinder, the method comprising the steps of:

sensing an excessive acceleration spin condition of the driven wheels;

disabling injection of fuel from selected fuel injectors to withhold fuel from their respective cylinders to reduce engine torque output driving the wheels when an excessive acceleration spin condition is sensed so as to allow recovery from the excessive acceleration spin condition, the remaining fuel injectors being enabled to deliver fuel to their respective cylinders to establish the scheduled air/fuel ratio therein;

reenabling injection of fuel from the selected fuel injectors when a sensed excessive acceleration spin condition of the driven wheels terminates;

setting a value of the scheduled air/fuel ratio by (A) determining a normal run air/fuel ratio, (B) sensing a power enrichment operating condition of the engine and decreasing the determined normal run air/fuel ratio by a predetermined power enrichment amount when a power enrichment operating condition of the engine is sensed, (C) inhibiting the decreasing of the determined normal run air/fuel ratio by the predetermined power enrichment amount while fuel from selected fuel injectors is disabled and for a predetermined time period following the reenabling of injection of fuel from the selected fuel injectors and (D) increasing the determined normal run air/fuel ratio while injection of fuel from selected fuel injectors is disabled so that the air/fuel ratio of the mixture in the cylinders corresponding to the enabled fuel injectors is leaned out from the normal run air/fuel ratio when fuel is being withheld from the remaining cylinders.

* * * * *